(12) United States Patent
Ellis et al.

(10) Patent No.: US 9,140,399 B2
(45) Date of Patent: Sep. 22, 2015

(54) QUICK COUPLING

(75) Inventors: Shawn D. Ellis, Golden Valley, MN (US); Daniel V. Davis, Maple Grove, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 647 days.

(21) Appl. No.: 13/247,461

(22) Filed: Sep. 28, 2011

(65) Prior Publication Data

US 2012/0085443 A1    Apr. 12, 2012

Related U.S. Application Data

(60) Provisional application No. 61/390,304, filed on Oct. 6, 2010.

(51) Int. Cl.
*F16L 37/32*    (2006.01)
*F16L 55/115*   (2006.01)

(52) U.S. Cl.
CPC .......... *F16L 55/115* (2013.01); *Y10T 29/49446* (2015.01); *Y10T 137/87957* (2015.04)

(58) Field of Classification Search
CPC ............ F16L 55/115; Y10T 29/49446; Y10T 137/87957; F16B 39/101; G01F 15/185
USPC .................. 137/614.04, 15.08, 15.17, 15.18; 285/80, 81, 86, 91, 92
See application file for complete search history.

(56) References Cited

U.S. PATENT DOCUMENTS

| | | | |
|---|---|---|---|
| 1,473,751 A * | 11/1923 | Walker | 285/80 |
| 1,801,261 A * | 4/1931 | Bailey | 285/80 |
| 3,035,408 A | 5/1962 | Silver | |
| 3,202,182 A | 8/1965 | Haviland | |
| 3,593,742 A | 7/1971 | Taylor | |
| 3,916,929 A | 11/1975 | Brown | |
| 4,402,531 A * | 9/1983 | Kennedy, Jr. | 285/91 |
| 4,646,773 A | 3/1987 | Klop et al. | |
| 4,768,551 A * | 9/1988 | Allread et al. | 137/614.04 |
| 5,241,982 A * | 9/1993 | Taylor | 285/80 |
| 5,299,607 A | 4/1994 | Monticup, Jr. | |
| 5,348,349 A * | 9/1994 | Sloane | 285/92 |
| 5,624,218 A * | 4/1997 | Dauwalter | 411/87 |

(Continued)

OTHER PUBLICATIONS

Parker Stratoflex Catalog 106-INDI, dated Aug. 1999, entitled: Indi-Lok, Quick Connect Valved Couplings for the Aerospace Industry.

(Continued)

*Primary Examiner* — Kevin Lee
*Assistant Examiner* — Craig J Price
(74) *Attorney, Agent, or Firm* — Renner, Otto, Boisselle & Sklar, LLP

(57) ABSTRACT

A first coupling member 10 has a body 11 and an internal poppet 16. The exterior of the body 11 includes flats 30. A lug 31 is formed on one of the flats 30 during machining of the flats 30. A dust cover attached to the first coupling member 11 includes a cover portion 40 and a tether portion 41. The cover portion 40 protects an exterior surface 19 of the body, and the cover portion 40 to and tether portion 41 each protects one lateral side of the lug 31. The tether portion 41 includes an annular ring portion 43 disposed in an annular groove 25. A second embodiment 110 of the first coupling member is also disclosed. A second coupling member 210 may be coupled to or uncoupled from either of the first coupling members 10 or 110.

12 Claims, 9 Drawing Sheets

(56) References Cited

U.S. PATENT DOCUMENTS

| | | | |
|---|---|---|---|
| 5,720,325 | A | 2/1998 | Grantham |
| 5,823,222 | A * | 10/1998 | Minshull et al. ......... 137/614.04 |
| 6,036,169 | A | 3/2000 | Wass |
| 6,045,115 | A | 4/2000 | Martin, Jr. et al. |
| 6,135,509 | A * | 10/2000 | Billington, III ................. 285/92 |
| 6,371,443 | B1 * | 4/2002 | Imai ......................... 137/614.04 |
| 7,340,939 | B2 | 3/2008 | Jansen |
| 7,726,335 | B2 | 6/2010 | Doble |
| 2011/0023810 | A1 | 2/2011 | Gerard et al. |

OTHER PUBLICATIONS

Parker Stratoflex Catalog 106-SLIDE, dated Aug. 1999, entitled: Slide-Lok, Quick Connect Valved Couplings for the Aerospace Industry.

Parker Quick Coupling Division, Hydraulic Quick Couplings, Dust Plugs and Dust Caps, pp. B-58 thru B-60. Applicants request the Examiner to consider this reference as prior art under 102(a), however, Applicants respectfully reserve the right to supplement this Information Disclosure Statement and take a contrary position should it be necessary.

Parker Quick Coupling Division, Drawing Title "Coupler", Drawing No. CD328, dated Nov. 4, 1996.

Parker Quick Coupling Division, Drawing Title Nipple', dated Jun. 23, 1998.

Parker Quick Coupling Division, Drawing Title "Dust Cap", dated May 13 1998.

Parker Quick Coupling Division, Drawing Title "Coupler Assembly", dated Dec. 14, 2004.

Parker Quick Coupling Division, Drawing Title "Dust Cap", dated Sep. 16, 2010.

* cited by examiner

QUICK COUPLING

CROSS REFERENCE TO RELATED APPLICATIONS

The present application claims the benefit of the filing date of U.S. Provisional Patent Application Ser. No. 61/390,304, filed Oct. 6, 2010, the disclosure of which is incorporated herein by reference in its entirety.

TECHNICAL FIELD

This invention relates to quick couplings.

BACKGROUND OF THE INVENTION

Quick couplings, which are also known as quick connect couplings or quick disconnect couplings, are used in a wide variety of applications. Quick couplings generally include first and second coupling members. At least one of the coupling members is typically secured to a flexible hose, and the other coupling member is typically secured to another flexible hose or to a rigid device such as a tank, pump, motor, valve, or other device.

When the coupling members are in a coupled configuration, fluid may flow between the coupling members. One of the coupling members may include a release sleeve, and actuation of the release sleeve unlocks the coupling members and permits disconnection. One or both of the coupling members may include a valve which is opened to permit fluid flow when the coupling members are in the coupled configuration and which is closed to terminate fluid flow when the coupling members are disconnected.

SUMMARY OF THE INVENTION

The present invention provides a quick coupling having a lock wire receiving lug and a quick coupling having a dust cap. More specifically, this invention provides a quick coupling having a lock wire receiving lug disposed on a wrench flat and a dust cover. The dust cover protects the outside diameter of the body of the quick coupling and protects the lug while allowing access to the lug. A lock wire receiving aperture is provided in the lug, and the lug is formed on the wrench flat during machining of the wrench flat. An annular groove receives a dust cover tether ring. A quick coupling release sleeve includes a radially outwardly projecting grip ring for ease of use.

The invention also provides various ones of the features and structures and methods described in the claims set out below, alone and in combination, and the claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

Figure 1:
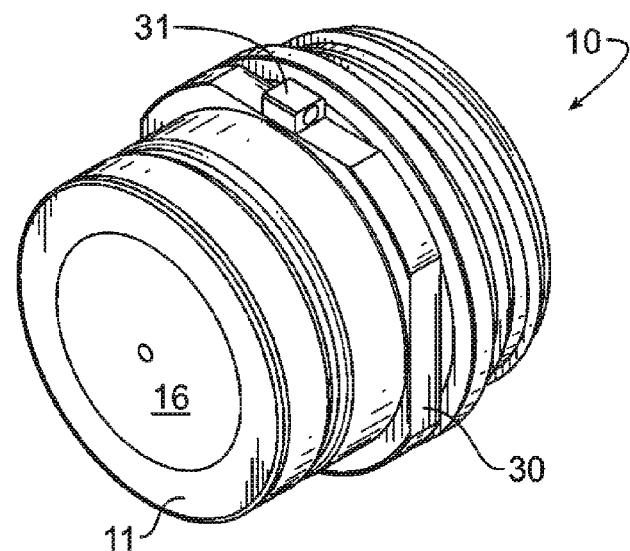
FIG. 1 is perspective view of a first quick coupling member according to a preferred embodiment of this invention.
Figure 2:
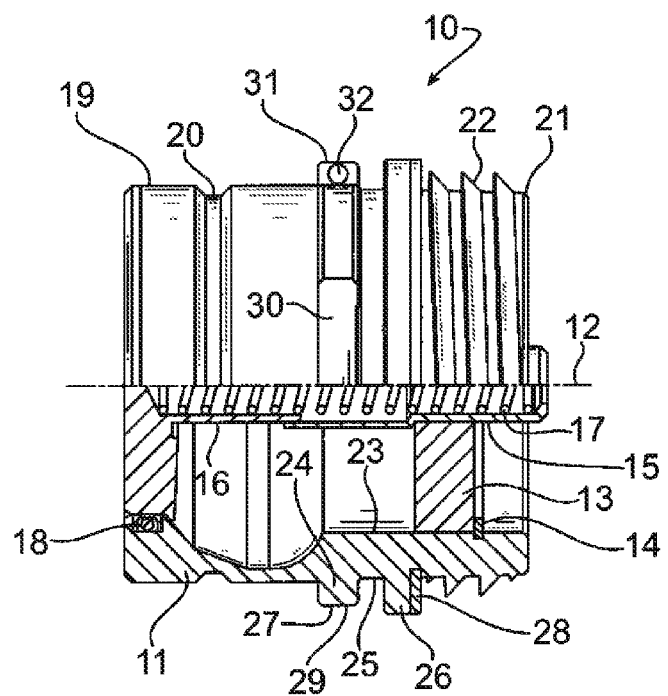
FIG. 2 is a longitudinal cross sectional view of the quick coupling member shown in FIG. 1.
Figure 3:
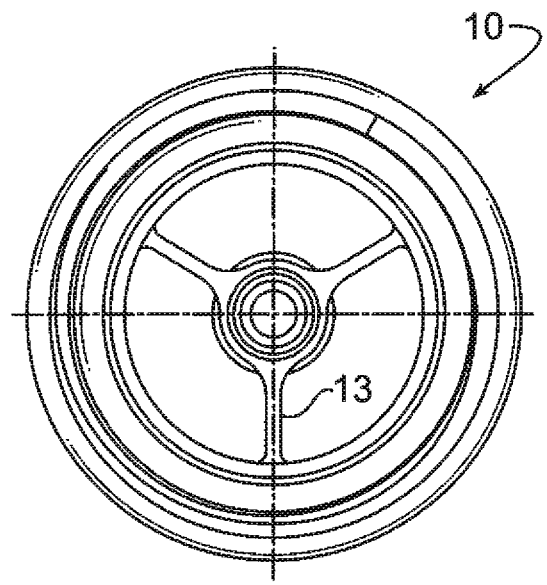
FIG. 3 is a lateral end view of the quick coupling member shown in FIG. 1.

Referring now to the drawings in greater detail, the principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

A preferred embodiment of a first coupling member 10, constructed in accordance with the present invention, is illustrated in FIGS. 1-4. All components of the first coupling member 10 are of a suitable material selected according to the pressure, temperature, fluid type, and other requirements of the application in which the coupling member 10 is to be used. In the preferred embodiment, the components other than the illustrated seals and dust cover may be of a suitable stainless steel material such as American Iron and Steel Institute (AISI) type 303 stainless steel. The seals and the cover may be of other suitable material such as ethylene propylene (EPDM) material. The first coupling member 10 is commonly of the type referred to as a nipple or as a male coupling member. The coupling assembly described below has valves in each coupling member of the coupling assembly and a relatively open or large cross sectional area fluid flow path, and such coupling assembly is commonly referred to as a fast flow double shut off coupling.

Figure 4:
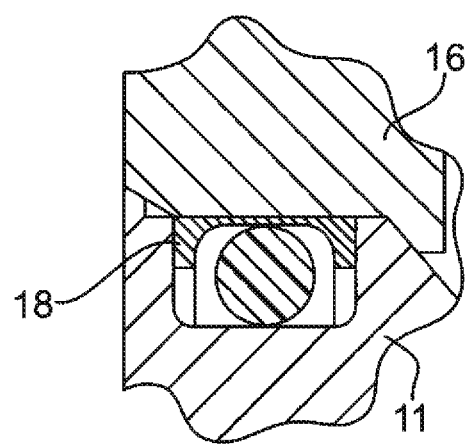
FIG. 4 is an enlarged view of a seal used in the quick coupling member shown in FIG. 1.

The coupling member 10 includes a generally cylindrical or generally tubular coupling member body 11 having an interior generally cylindrical opening extending from end to end along a longitudinal axis 12. The coupling member body 11 carries a generally flat circular shaped retainer 13. The retainer 13 includes a central hub and a plurality of circumferentially spaced spokes as viewed in FIG. 3, so that fluid may flow through the coupling member 10 between the spokes. In the preferred embodiment illustrated in the drawings, the retainer 13 includes three spokes. The retainer 13 is held against movement in the coupling member body 11 by a retaining ring 14. The retainer 13 carries a longitudinally extending generally cylindrical stationary guide 15. The left end of the guide 15 as viewed in FIG. 1 carries a valve poppet 16, which is arranged for longitudinal sliding movement relative to the guide 15, retainer 13, and body 11. A spring 17 acts between the poppet 16 and the right end of the retainer 13. The spring 17 biases the poppet 16 to a normally closed position illustrated in FIG. 1 and biases the retainer 13 to the position illustrated in FIG. 1 against the retaining ring 14. An annular slipper seal 18, shown in detail in FIG. 4, is carried on the left side of the body 11 and seals against the poppet 16 when the poppet 16 is in the closed position illustrated in FIG. 1 to prevent fluid flow through the coupling member 10.

Still referring to FIGS. 1-4, the left exterior cylindrical surface 19 of the body 11 includes an annular locking groove 20 for receiving locking members of another coupling member described below when the first coupling member 10 is secured to the other coupling member. The right exterior cylindrical surface 21 of the body 11 includes external threads 22 which may be of any type and which are of the type know as American buttress threads in the illustrated preferred embodiment or pipe threads. A central region 23 of the body 11 intermediate the cylindrical surfaces 21 and 19 includes an annular radially outwardly extending flange 24. An annular groove 25 in the flange 24 divides the flange 24 into a right or first flange portion 26 and a left or second flange portion 27. The first flange portion 26 is disposed between the annular groove 25 and the threaded exterior surface portion 21. The coupling member exterior surface portion 21 may be threaded into an internally threaded hole of a rigid member (not shown), such as a tank, pump, motor, valve, or other associated device to which the coupling member 10 is secured in order to provide a fluid connection to such device. The first flange portion 26 provides a rigid annular stop or engagement surface to limit the threaded engagement of the coupling member 10 onto its associated device, and a flat annular disk shaped gasket 28 provides a seal that acts between the first flange portion 26 and its associated device to prevent fluid leakage between the first flange portion 26 and its associated device.

The second flange portion 27 includes an exterior surface 29, and a plurality of circumferentially spaced generally flat surfaces 30 are formed on the exterior surface 29. The flat surfaces 30 provide gripping surfaces or wrench flats for tightening the coupling member 10 onto its associated device described above. A radially outwardly projecting lug 31 is provided on one or more of the surfaces 30. An aperture 32 extends completely through the lug 31, and the lug 31 and flat surfaces 30 are substantially disposed in a lateral plane generally perpendicular to the longitudinal axis 12; or the protrusion lug 31 has an aperture 32 extending circumferentially therethrough. When the coupling member 10 is threaded onto its associated device, a lock wire (not shown) extends through the aperture 32 in a direction substantially perpendicular to the longitudinal axis 12. The lock wire may be connected to its associated device described above when the coupling member 10 and its associate device are connected together to prevent removal of the coupling member 10 without severing the lock wire.

The lug 31 is formed when the flats 30 are machined on the exterior surface 29 of a coupling member blank. The exterior surface 29 of the blank, before this machining, is generally round or circular in shape. The radially outermost exterior surface of the lug 31 is generally within the diameter of the round shaped exterior surface 29 that exists before this machining begins and within a circle or imaginary cylinder defined by the radially outmost surfaces of each of the flats 30 after this machining. The flats 30 are formed by machining away portions of this round exterior surface, to form the generally flat surfaces 30. The lug 31 is disposed substantially in the center of one of the surfaces 30, so that the lug 31 may be formed by leaving (or not cutting away) the material of the lug 31 when the surfaces 30 are machined on the exterior surface 29. The lug 31 projects radially outward from its associated adjacent flat, so that the lug 31 and aperture 32 are easy to find by the installer technician and provide an additional visual cue to install the lock wire. Also, with the aperture 32 facing in the circumferential direction, it is easy for the installer technician to install the lock wire into and through the aperture. Further, as described below, the lug 31 and aperture 32 are protected by a dust cover.

Figure 5:
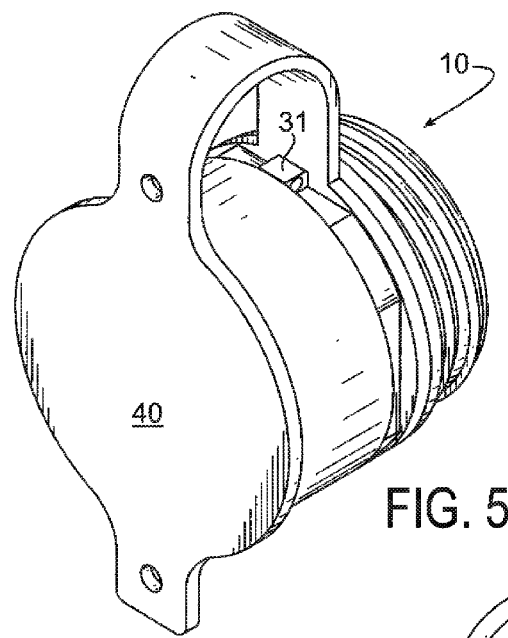
FIG. 5 is a perspective view showing the quick coupling member of FIG. 1 with a dust cover installed.
Figure 6:
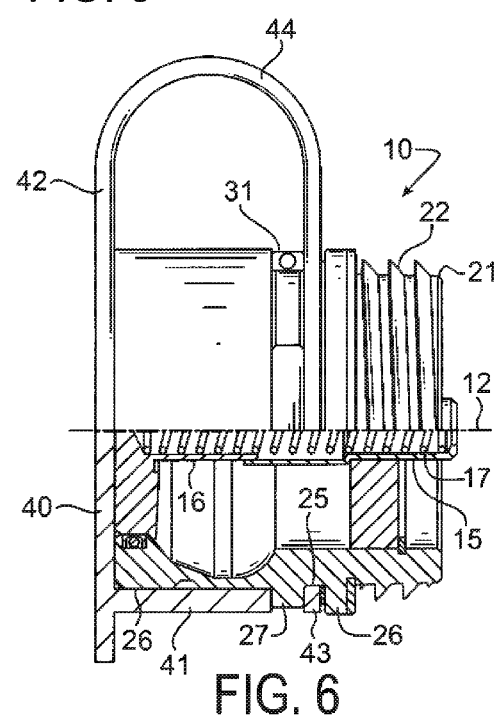
FIG. 6 is a longitudinal cross sectional view of the quick coupling member shown in FIG. 5.
Figure 7:
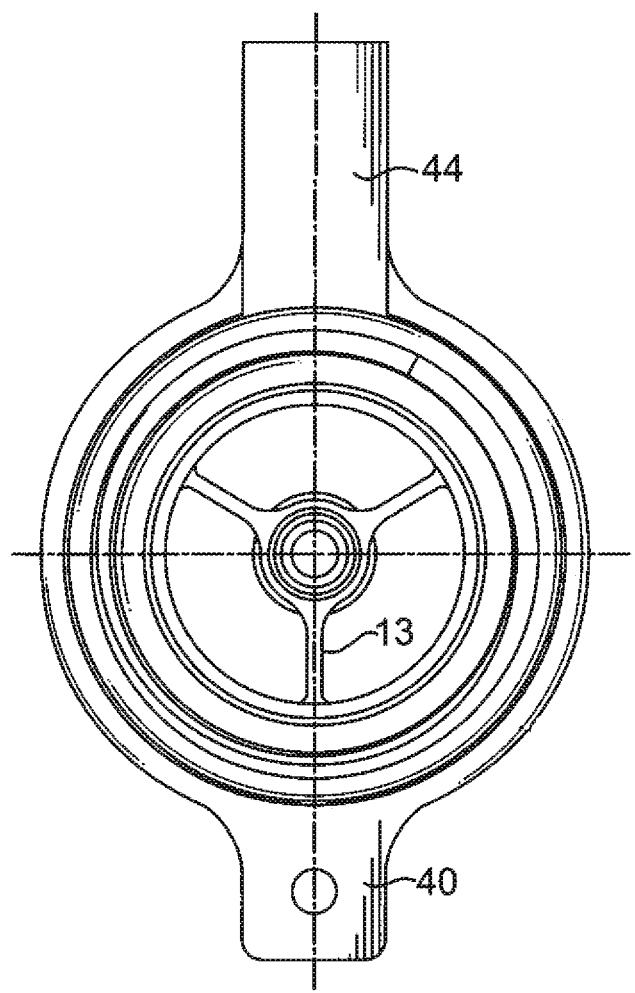
FIG. 7 is a lateral end view of the quick coupling member shown in FIG. 5.

Referring now to FIGS. 5-7, the coupling member 10 is illustrated in combination with an associated dust cover 40. The dust cover 40 includes a generally cylindrical closed end cover portion 41 that is received on the end portion 19 with a friction fit to protect the poppet 16, slipper seal 18 and end portion 19 from dirt and other contaminants when the coupling member 10 is disconnected from its associated coupling member described below. The cover portion 41 is removed from the end portion 19 when the coupling member 10 is to be connected to its associated coupling member. The dust cover 40 also includes a tether portion 42. The tether portion 42 includes an annular retaining or ring portion 43 that is disposed in the annular groove 25 and a flexible connecting portion 44 that extends between and connects the cover portion 41 and the retaining portion 43. The dust cover 40 does not block the aperture 32 when the cover portion 41 is installed on the end portion 26 or when the cover portion 41 is removed from the end portion 26. The cover portion 41 covers and protects one longitudinally facing side of the lug 31 when the cover portion 41 is installed on the end portion 26 as shown in FIGS. 5-7, and the retaining portion 43 protects the other longitudinally facing side of the lug 31 from damage when the cover portion 41 is installed or removed from the end portion 26.

Figure 8:
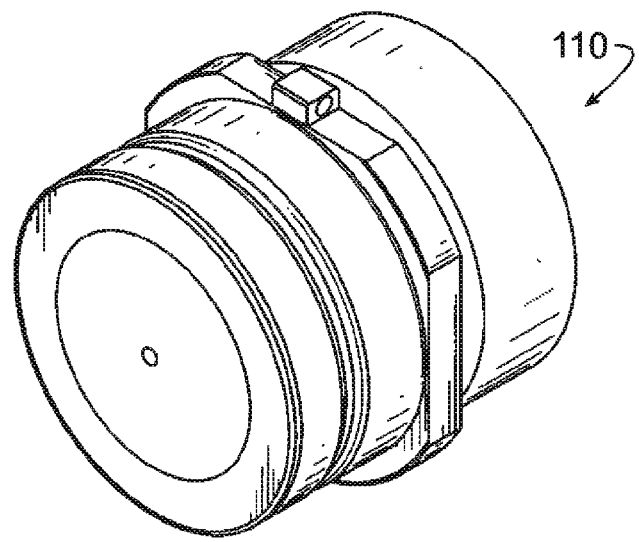
FIG. 8 is perspective view of a first quick coupling member according to a second embodiment of this invention.
Figure 9:
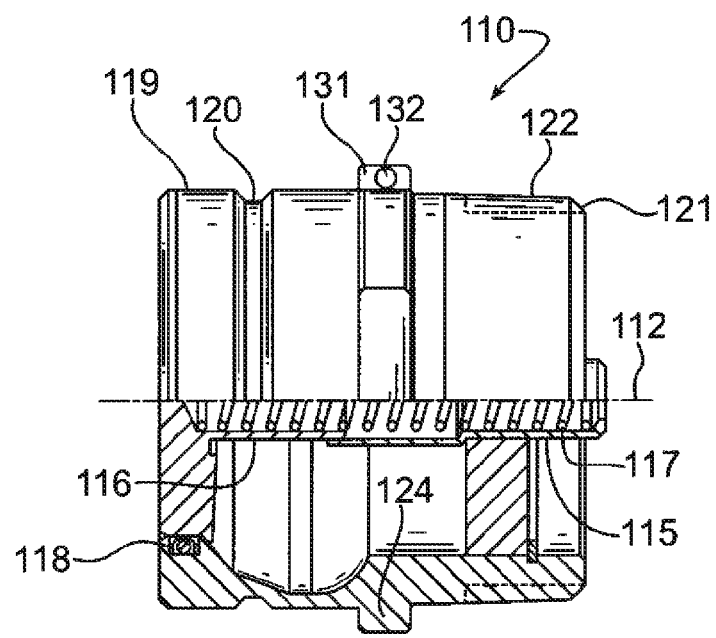
FIG. 9 is a longitudinal cross sectional view of the quick coupling member shown in FIG. 8.
Figure 10:
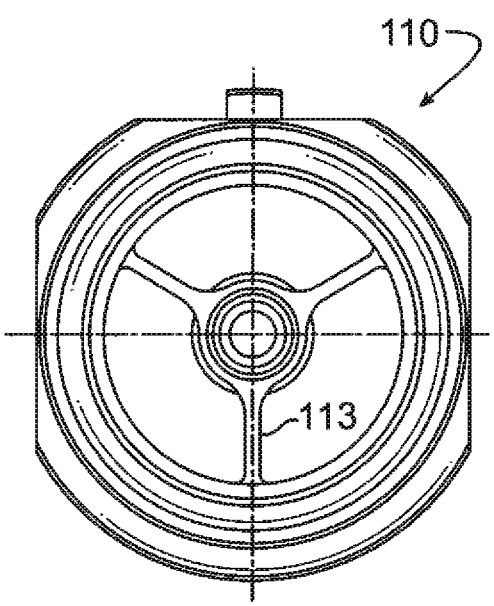
FIG. 10 is a lateral end view of the quick coupling member shown in FIG. 8.
Figure 11:
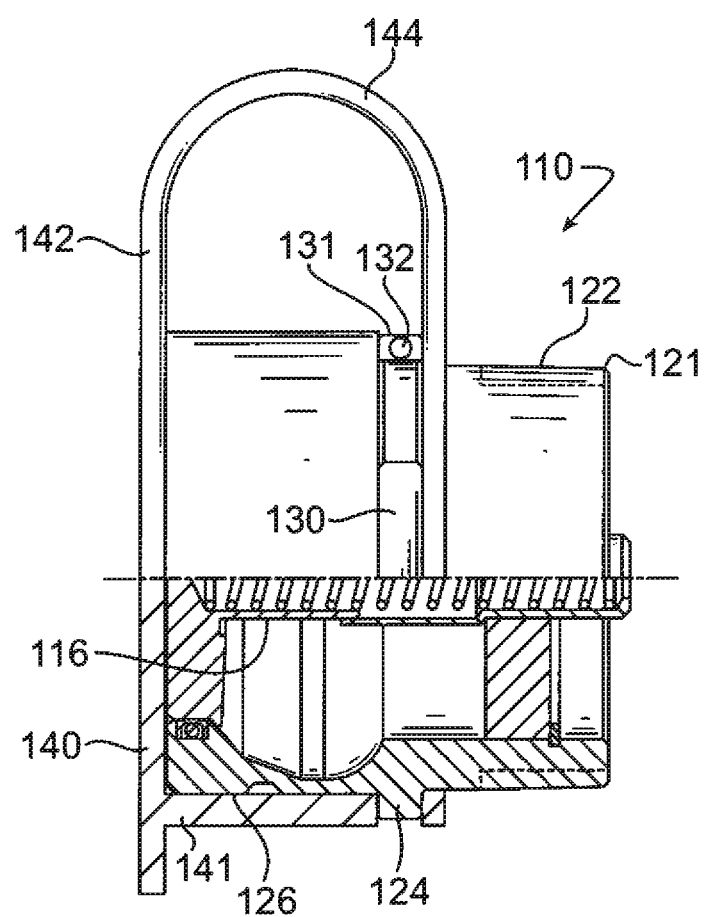
FIG. 11 is a longitudinal cross sectional view showing the quick coupling member of FIG. 8 with a dust cover installed.
Figure 12:
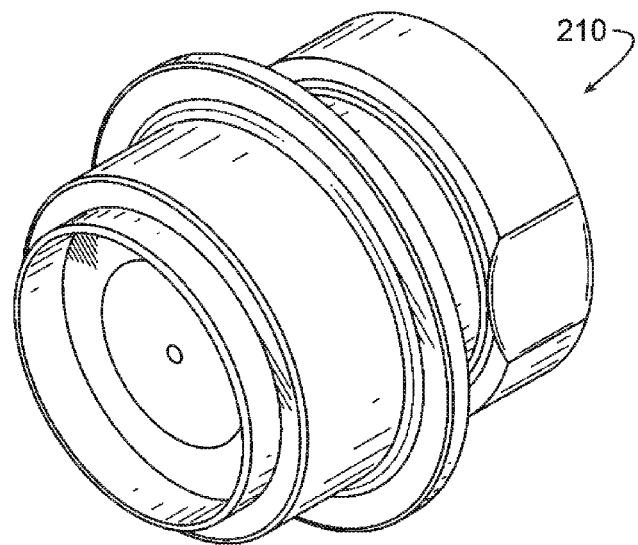
FIG. 12 is perspective view of a second quick coupling member used with the first quick coupling members shown in FIGS. 1 and 8.
Figure 13:
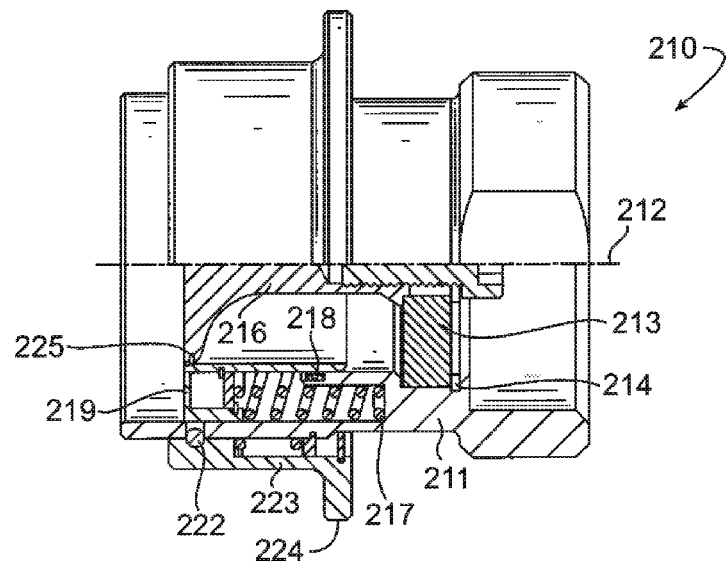
FIG. 13 is a longitudinal cross sectional view of the quick coupling member shown in FIG. 12.
Figure 14:
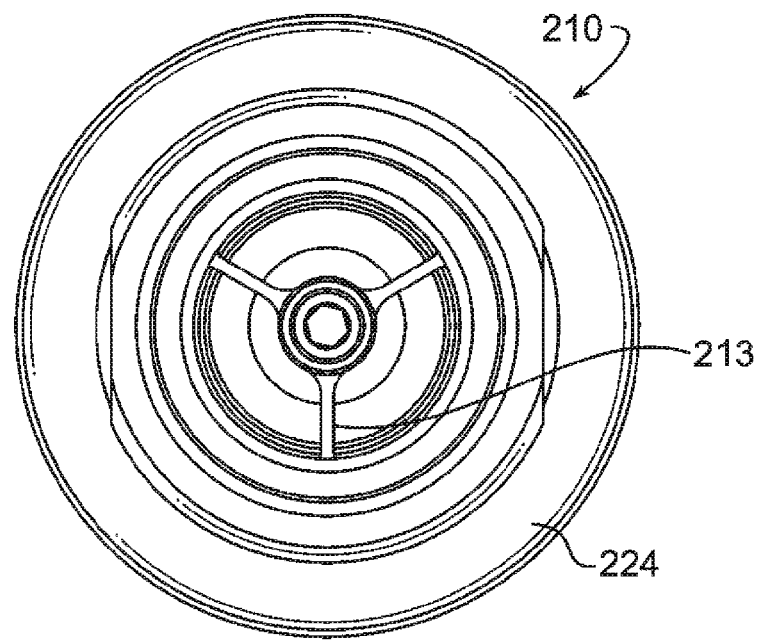
FIG. 14 is a lateral end view of the quick coupling member shown in FIG. 12.
Figure 15:
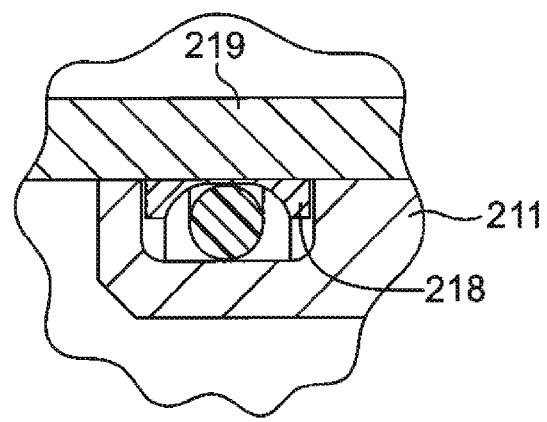
FIG. 15 is an enlarged view of a seal used in the quick coupling member shown in FIG. 12.

Referring now to FIGS. 8-11, a second embodiment of a first coupling member 110 according to the present invention is illustrated. FIGS. 8-10 illustrate the coupling member 110 without a dust cover, and FIG. 11 illustrates the coupling member 110 with a dust cover. Various reference numbers applied to FIGS. 8-11 are the same as the reference numbers applied to FIGS. 1-7 and generally described above, but with a prefix number 1 added. The external threads 122 of the coupling member 110 are not American buttress threads, but instead are National Pipe Thread Fuel (NPTF) threads.

Referring now to FIGS. 12-15, a known second coupling member 210 used with either of the above described embodiments of the first coupling member 10, 110 is illustrated. The right end of the second coupling member 210 is preferably arranged to be received on the end of a flexible hose (not shown). The coupling member 210 includes a generally cylindrical or generally tubular coupling member body 211 having a longitudinal axis 212. The coupling member body 211 carries a circular shaped retainer 213. The retainer 213 includes a central hub and a plurality of spokes as viewed in FIG. 14, so that fluid may flow through the coupling member 210 between the spokes. The retainer 213 is held against movement in the coupling member body 211 by a retaining ring 214. The retainer 213 carries a valve poppet 216, which is stationary relative to the retainer 213 and body 211. Concentric springs 217 act between an annular valve seat assembly 219 and the body 211. The springs 217 bias the seat assembly 219 to a normally closed position illustrated in FIG. 13 against the poppet 216. An annular seal 225 is carried on the poppet 216 and seals against the seat assembly 219 when the seat assembly 219 is in the closed position illustrated in FIG. 13 to prevent fluid flow through the coupling member 210. An annular slipper seal 218 seals between the seat assembly 219 and the body 211.

Still referring to FIGS. 12-15, the left exterior cylindrical surface of the body 211 includes locking devices such as locking balls 222 and a locking sleeve 223. The locking sleeve 223 includes a radially outwardly extending gripping flange 224. When the first coupling member 10, 110 is connected to the second coupling member 210, the lateral end face of the body 11, 111 contacts the valve seat 219 and moves the valve seat assembly 219 away from the seal 218 carried on the poppet 216 to open the second coupling member 210 and allow flow through the second coupling member 210. In this connected position, the poppet 216 engages and opens the poppet 16, 116 of the first coupling member 10, 110 to open the first coupling member and allow flow through the first coupling member. In this connected position, the locking balls 222 are received in the locking groove 20, 120 of the first coupling member 10, 110 to lock the first and second coupling members together and the locking sleeve 223 retains the locking balls 222 in the locking groove. The coupling members may be used in any appropriate application in which it is desired to convey a fluid from one device to another, for example on the ends of flexible hoses or in association with other fluid components. In one use of the coupling members 10, 110 and 210, the first coupling member 10, 110 may be secured to a tank or other bulk fluid container (not shown). The second coupling member 210 may be secured to a flexible hose on a refilling station or truck (not shown) to transfer fluid from the refilling station or truck to the tank or other bulk fluid container. The fluid that is to be transferred may be any suitable fluid, and in one application the fluid is diesel exhaust fluid. When the first and second coupling members are to be disconnected, the sleeve 223 is pulled back to the right as viewed in FIG. 13 by manually gripping the radially outwardly projecting flange 224 of the locking sleeve 213. The locking balls 222 are then free to move radially outwardly from the locking groove 20, 120 to permit disconnection. When the first coupling member 10, 110 is disconnected from the second coupling member 210, the first and second coupling members each close to prevent further flow of fluid.

Presently preferred embodiments of the invention are shown and described in detail above. The invention is not, however, limited to these specific embodiments. Various changes and modifications can be made to this invention without departing from its teachings, and the scope of this invention is defined by the claims set out below. Also, while the terms first and second, one and another, left and right, are used to more clearly describe the structure and operation of the illustrated coupling members, it should be understood these terms are used for purposes of clarity and may be interchanged as appropriate. Further, separate components illustrated in the drawings may be combined into a single component, and single components may be provided as multiple parts.

What is claimed is:

1. A coupling member comprising a body having a longitudinal axis and a normally-closed valve housed within the body, the body having a generally cylindrical exterior surface, a plurality of circumferentially spaced generally flat wrench surfaces on the exterior surface, a lug formed on at least one of the wrench surfaces and extending radially outwardly therefrom, and a lock wire aperture extending through the lug, and wherein a radially outermost surface of the lug is within an imaginary cylinder defined by radially outermost portions of the wrench surfaces.

2. A coupling member as set forth in claim 1, wherein the wrench surfaces and the lug and the aperture are generally disposed in a plane generally perpendicular to a longitudinal axis of the coupling member.

3. A coupling member as set forth in claim 1, in combination with a dust cover.

4. A coupling member as set forth in claim 3, wherein the dust cover includes a cover portion and a tether portion.

5. A coupling member as set forth in claim 4, wherein the tether portion is longitudinally adjacent one lateral side of the lug.

6. A coupling member as set forth in claim 5, wherein the cover portion has an installed position and a removed position, and the cover portion is longitudinally adjacent the other lateral side of the lug when the cover portion is in the installed position.

7. A coupling member as set forth in claim 1, wherein the exterior surface includes an annular groove adjacent the wrench surfaces and the lug.

8. A coupling member as set forth in claim 7, in combination with a dust cover, the dust cover includes a cover portion and a tether portion, and the tether portion includes an annular retaining portion disposed in the annular groove longitudinally adjacent one lateral side of the lug.

9. A coupling member as set forth in claim 8, including an annular stop portion adjacent a side of the annular groove opposite the wrench surfaces.

10. A fast-flow, double shut-off, quick-disconnect coupling for transfer of fluid from a hose on a refilling station or truck to a tank or other bulk container comprising a male nipple member having a generally tubular nipple body extending between a first end for a threaded or other connection to the container and a second end and a normally-closed first valve housed within the nipple body, a female coupler member having a generally tubular coupler body extending between a first end for a threaded or other connection to an end of the hose and a second end configured to coaxially receive the second end of the nipple body for coupling the nipple member to the coupler member, and a normally-closed second valve housed within the coupler body, wherein as the second end of the nipple body is inserted coaxially into the second end of the coupler body to couple to the nipple member to the coupler member, the first and the second valve each is opened to allow for the flow of fluid through the coupling, and further including a sleeve mounted coaxially about the coupler body, the sleeve being slidably moveable over the coupler body to release the nipple member from the coupler member, the sleeve having a flange extending radially outwardly therefrom, and the flange being manually grippable to slidably move the sleeve over the coupler body; and wherein the nipple body has an exterior surface, a plurality of circumferentially spaced generally flat wrench surfaces on the exterior surface, and at least one protrusion lug with an aperture extending circumferentially therethrough, the protrusion lug protruding radially outwardly from one of the wrench surfaces for providing a visual cue to locate the lug and aperture to receive a lock wire or other tie through the aperture for tying down the nipple member to the container, and wherein a radially outermost surface of the lug is within an imaginary cylinder defined by radially outermost portions of the wrench surfaces.

11. The coupling of claim 10, wherein the fluid is diesel exhaust fluid.

12. A method of making a coupling member comprising sequential steps of providing a coupling member blank having a generally cylindrical external surface having a diameter, machining away circumferentially spaced portions of the generally cylindrical external surface to provide a plurality of generally flat circumferentially spaced coplanar wrench surfaces, and leaving on one of the flat wrench surfaces a lug extending radially from the flat surface, wherein a radially outermost surface of the lug is within an imaginary cylinder defined by radially outermost portions of the wrench surfaces.

* * * * *